United States Patent [19]

Celentino et al.

[11] Patent Number: 5,704,579

[45] Date of Patent: Jan. 6, 1998

[54] DRINK CONTAINER HOLDER USABLE ESPECIALLY IN AUTOMOTIVE VEHICLES

[75] Inventors: Michael Frederick Celentino, Novi; Charles Lee Choi, Ann Arbor; John Matthew Ginder, Plymouth; Catherine MacQueen Lunde, Birmingham, all of Mich.

[73] Assignee: Ford Global Technologies, Inc., Dearborn, Mich.

[21] Appl. No.: 697,514

[22] Filed: Aug. 26, 1996

[51] Int. Cl.⁶ .................................................. A47K 1/08
[52] U.S. Cl. .................................. 248/311.2; 224/926
[58] Field of Search ......................... 248/311.2, 314, 248/315, 310, 313, 316.1, 316.2, 316.3, 316.7, 316.8, 346.01, 346.07, 346.11, 346.2; 224/926

[56] References Cited

U.S. PATENT DOCUMENTS 5,297,767  3/1994  Miller et al. ................. 224/926 X
5,398,898  3/1995  Bever ............................ 248/313 X
5,509,633  4/1996  Ruster et al. ................. 224/926 X
5,549,837  8/1996  Ginder et al. ................ 252/62.52

OTHER PUBLICATIONS 3 page description of Magneto–Rheological Fluid by Lord Corporation.

*Primary Examiner*—Ramon O. Ramirez
*Assistant Examiner*—Stephen S. Wentsler
*Attorney, Agent, or Firm*—Damian Porcari

[57] ABSTRACT

A holder for a beverage container including a container support platform having a central axis, and a series of container contact elements disposed around the central axis for exerting positioning forces on side surfaces of the container. Each container contact element contains a liquid core material that transitions to a near-solid state when subjected to a magnetic field. Magnetic mechanisms are provided in the holder for generating one or more magnetic fields, that have the result of rigidifying the container contact elements to conform to a range of different container sizes and shapes. The magnetic mechanisms can be electromagnets or permanent magnets.

20 Claims, 4 Drawing Sheets

DRINK CONTAINER HOLDER USABLE ESPECIALLY IN AUTOMOTIVE VEHICLES

BACKGROUND OF THE INVENTION

1. Field Of The Invention

This invention relates to a holder for a drink container, e.g. a coffee cup, juice container or disposable soft drink cup. The invention has particular utility in automotive vehicles, especially in the console proximate to the driver's seat or a pullout component underneath the dashboard.

2. Description Of The Related Prior Art Development

Cup holders have been used in automotive vehicles for holding a range of different drink containers, e.g. reusable coffee cups or disposable coffee containers, small milk cartons, disposable soft drink containers, and small cylindrical juice containers. Typically, the cup holder will take the form of a rigid plastic tray having at least one shallow depression sized to fit a particular size container. Such a tray can be mounted on the vehicle instrument panel or on console that separates the driver's seat from the front passenger seat.

One problem with conventional cupholders is that the depression in the tray fits only one size (or shape) container. If the container is larger than the depression, then the tray is unusable for the intended purpose. If the container has a smaller diameter than the depression, then the container will tend to slide back and forth in the depression, possibly tipping over, especially if the vehicle should be moving over rough terrain or along a paved surface having pot holes in the path of the vehicle ground wheel.

Some of the newer cupholders designs incorporate flexible inserts to accommodate more cup sizes. However, a trade-off exists in that slimmer cups are not held as sturdily so as to tip, while larger diameter cups are difficult to insert and remove. A truly adjustable cupholder would eliminate the tradeoff, but might necessitate multiple parts and complex mechanisms.

The present invention is directed to a holder for a container, wherein the holder has relatively few parts while nevertheless having the capability for adjusting to a range of different container sizes and shapes.

SUMMARY OF THE INVENTION

The invention relates to a holder for a container, wherein two or more container contact elements are disposed around the central axis of a container-support platform, to exert a positioning force on the container side surface. Each container contact element comprises a flexible outer casing and an inner core liquid that transitions to a near-solid state when subject to a magnetic field. The preferred liquid is a known viscous liquid material referenced in the art as magneto-rheologic fluid.

A controllable magnet means is magnetically connected to the magneto-rheologic fluid, so that when a container is positioned in the holder, the magnet means can be activated to transform the liquid into a near-solid condition. This rigidifies the outer casing of each container contact element to a condition conforming to the container side surfaces, such that the container is retained against inadvertent displacement out of the holder.

The rigidified container contact elements exert a relatively light positioning force on side surfaces of the container so that the container can be manually lifted out of the holder without undue effort. As long as the magnet means is activated the container contact elements remain in the rigidified condition. Therefore, the container can be removed from the holder and returned to the holder any number of times without adversely affecting the fit of the holder on the container.

The holder can be adjusted in size to accommodate a different size container; the procedure involves temporarily de-activating the magnet means so that the magneto-rheologic material returns to the liquid state. With the core material in the liquid state, the container contact elements are relatively flexible or deflectable. The new container can be inserted into the holder to deflect the container-contact elements into conformance with the container side surfaces. The magnet means can then be activated to transform the core material into a near-solid condition thereby effectively rigidifying the container-contact elements in the desired size conforming to the new container dimensions.

The magnet means can be one or more electromagnets, or one or more permanent magnets. When the magnet means is electromagnetic the control means can be a manual switch in series with the magnet coils. When the magnet means comprises one or more permanent magnets the control means can be a manual mechanism arranged to move at least one of the magnets between an operating position magnetically aligned with the core liquid and an inactive position out of magnetic alignment with the core liquid.

Various features and advantages of the invention will be apparent from the attached drawings and description of illustrative embodiments of the invention.

DESCRIPTION OF PREFERRED EMBODIMENTS OF THE INVENTION

Figure 1:
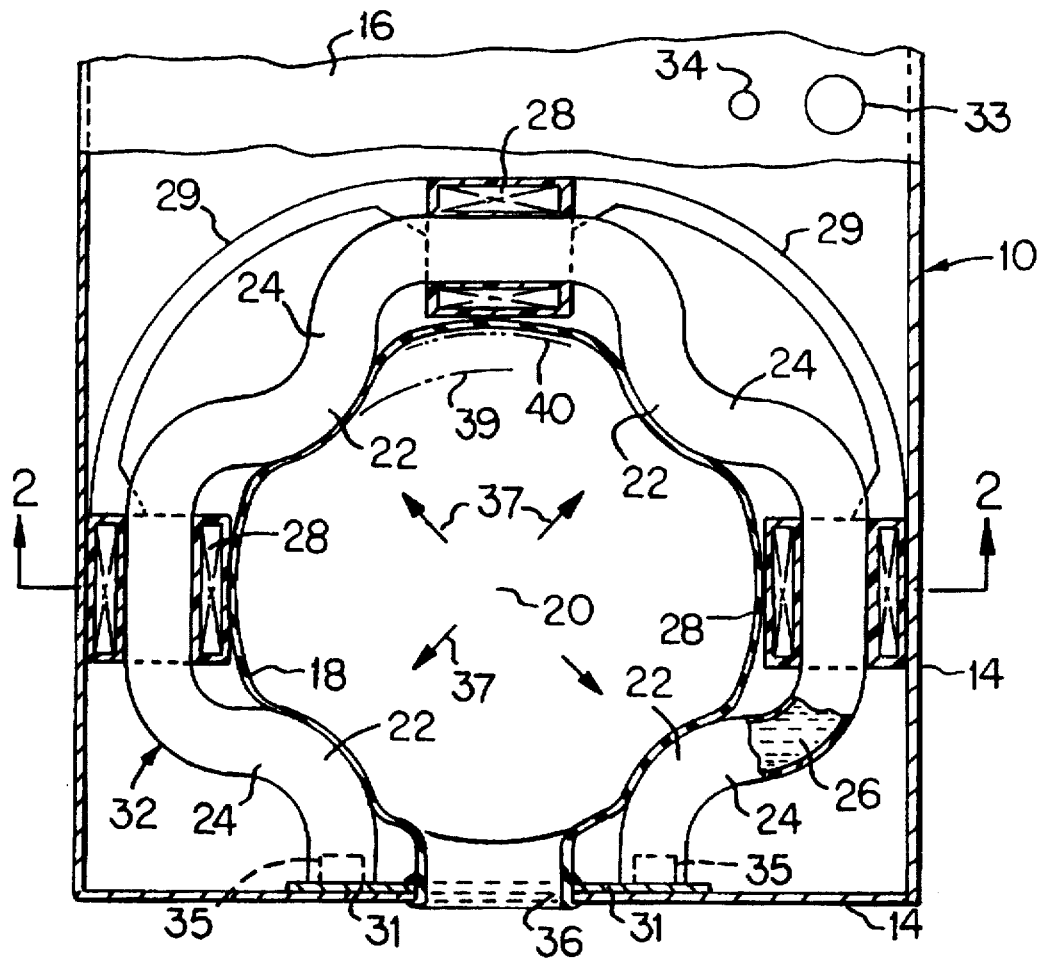
FIG. 1 is a sectional view of an illustrative embodiment of the invention taken on line 1—1 in FIG. 2.
Figure 2:
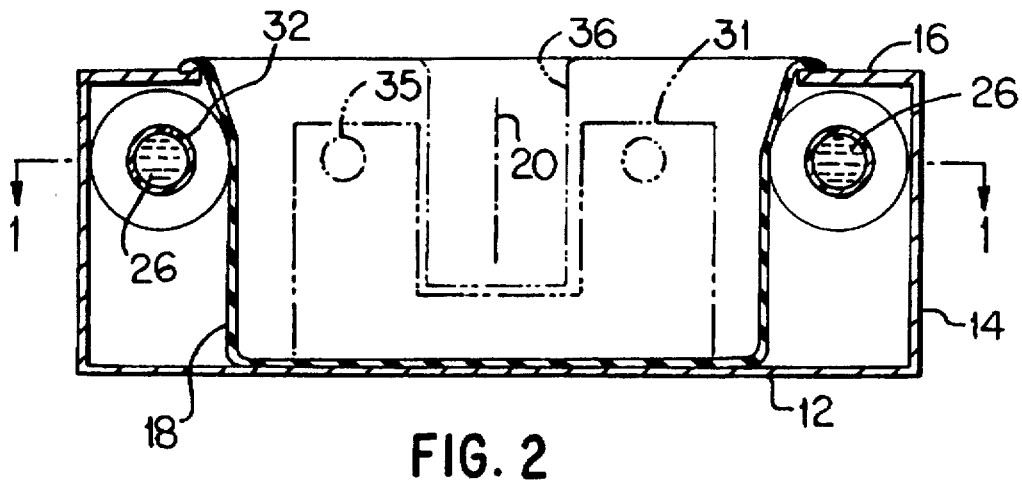
FIG. 2 is a sectional view taken on line 2—2 in FIG. 1.

Referring particularly to FIGS. 1 and 2, there is shown a holder for a drink container (not shown in the drawing). The holder is suitable for disposition in, or on, the console instrument panel or door in a conventional automotive vehicle. The holder includes three magnetic coils, an electric control switch, and connective wiring for operatively connecting the coils to a low voltage D.C. source, i.e. the vehicle battery power source.

The holder comprises an outer housing or shroud 10, that provides a container support platform 12, plural side walls 14, and top wall 16. A removable liner 18, formed of thin rubber sheet material, is removably attached to the edge area of a circular opening in top wall 16 for disposition within housing 10. The non-illustrated drink container is insertable into the space circumscribed by liner 18, to a position centered generally on the central axis 20 of platform 12. Liner 18 can be removed for cleaning purposes.

The holder comprises four container contact elements 22 disposed around central axis 20 for exerting a positioning force on a drink container resting on platform 12 (i.e. the upper surface of liner 18). Each container contact element comprises a flexible tubular casing 24, and an inner liquid core 26. The liquid core material is a known magneto-rheologic fluid that transitions to a near-solid state when subjected to a magnetic field.

The fluid typically comprises a suspension of micron-sized magnetizable particles in an oil-like carrier liquid. Normally the fluid is a free-flowing liquid having a consistency similar to that of motor oil. When a magnetic field is applied to the fluid the suspended particles are magnetized so that the particles effectively align to give the material a relatively stiff consistency approximately similar to cold peanut butter. The action is essentially instantaneous, as perceived by the user.

One suitable magneto-rheological fluid useful in practice of the invention is a fluid obtainable commercially from the Lord Corporation of 405 Gregson Drive, Cary, N.C. under the trademark RHEONETIC.™

The four tubular casings 24 can be formed out of a single continuous plastic conduit 32 heat-formed to the convoluted external shape depicted in FIG. 1. FIG. 1 represents the normal undeflected condition for each flexible casing 24 (with the electro-magnetic coils de-energized.) A single continuous liquid core material 26 fills the entire conduit, such that each hollow container element 22 has a liquid fill therein.

The single plastic conduit extends through three electro-magnetic coils 28 that are suitably mounted in housing 10. The lead wiring for coils 28 can include a rigid wiring harness 29 having snap-on electrical connections to the various coils. The coils are wired in series to maximize current flow through each coil.

The magnetic circuit comprises the three magnetic coils, the continuous liquid core material 26, and an upright pole piece 31 that is suitably attached to one side wall 14 of the housing so as to span the ends of the plastic conduit 32. Pole piece 31 comprises an upright U-shaped plate having two magnetically permeable plugs 35 that fit into the ends of conduit 32 to seal against liquid escape and also form magnetic connections between the liquid and plate 31.

Coils 28 are energized simultaneously by manual actuation of a push-push switch 33 accessible at the top wall of housing 10. The switch is connected in series with the coils and an indicator lamp 34, such that lamp illumination serves as an indication that the coils are electrically energized. Lamp 34 is preferably a low current consumption device, e.g. a light emitting diode. The described circuitry is connected to an automotive D.C. voltage source, e.g. the battery of an automotive vehicle in which holder housing 10 is installed.

FIG. 2 shows the pole piece 31 out of position, as indicated by the dashed lines. The pole piece has a U-shape that enables a cut-out 36 to be formed in the housing side wall. The cut-out has the function of accommodating the handle of a drinking cup positioned in the holder. Liner 18 is designed to form a molding around the edge of the cut out, such that any spilled beverage is confined to the space within the liner, i.e. the exported surface of the liner.

Each flexible casing 24 has two anchored ends and an intermediate deflectable section that protrudes from the anchored ends toward the central axis 20. Coils 28 and plugs 35 form anchorages for flexible casing 24. When coils 28 are de-energized the intermediate sections of tubular casings 24 are flexible and deformable. A beverage container can be lowered into the holder to deflect the tubular casings 24 away from central axis 20, such that the protruding section of each tubular casing has frictional contact with the side surface of the container (or the corner surface in the case of a square milk container).

With a beverage container positioned in the holder, switch 33 can be pushed down to electrically energize coils 28. Nearly instantly the core liquid 26 transitions to a near-solid state. The tubular casings 24 rigidify so that the beverage container is effectively retained in a fixed position in the holder. With coils 28 energized, the tubular casings 24 are rigidified so that the beverage container can be removed and returned to the holder without affecting the casing 24 positionment.

Should the user decide to place a different size container in the holder, switch 33 is operated to de-energize coils 28, whereupon the core material 26 immediately returns to the liquid state. The new container can be inserted into the holder so that tubular casings 24 are deflected radially outwardly away from central axis 20 to positions conforming to the side surface dimensions of the container. Switch 33 can then be operated again to energize coils 28 for rigidifying the container-contact elements 22 to the new container size.

The radial protruding nature of each tubular casing 24 is advantageous in that each container contact element 22 can be deflected away from central axis 20 a comparatively great distance. The beverage container produces radial forces 37 that deflect the container contact elements 22 by shifting each tubular casing 24 bodily away from the central axis 20.

The holder can thus accommodate a range of different beverage container sizes and shapes (e.g. round or square.) In FIG. 1, the range of beverage container sizes is indicated generally by the two imaginary circular arcs 39 and 40.

In preferred practice of the invention, the range of container diameters accommodated by the deflectable container-contact elements comprises a minimum value of about sixty millimeters and a maximum value of about ninety five millimeters. These dimensions encompass size variations from a small six ounce paper cup to a large "Big Gulp" thirty two ounce cup. The container can be non-circular, e.g. a square milk carton.

Figure 3:
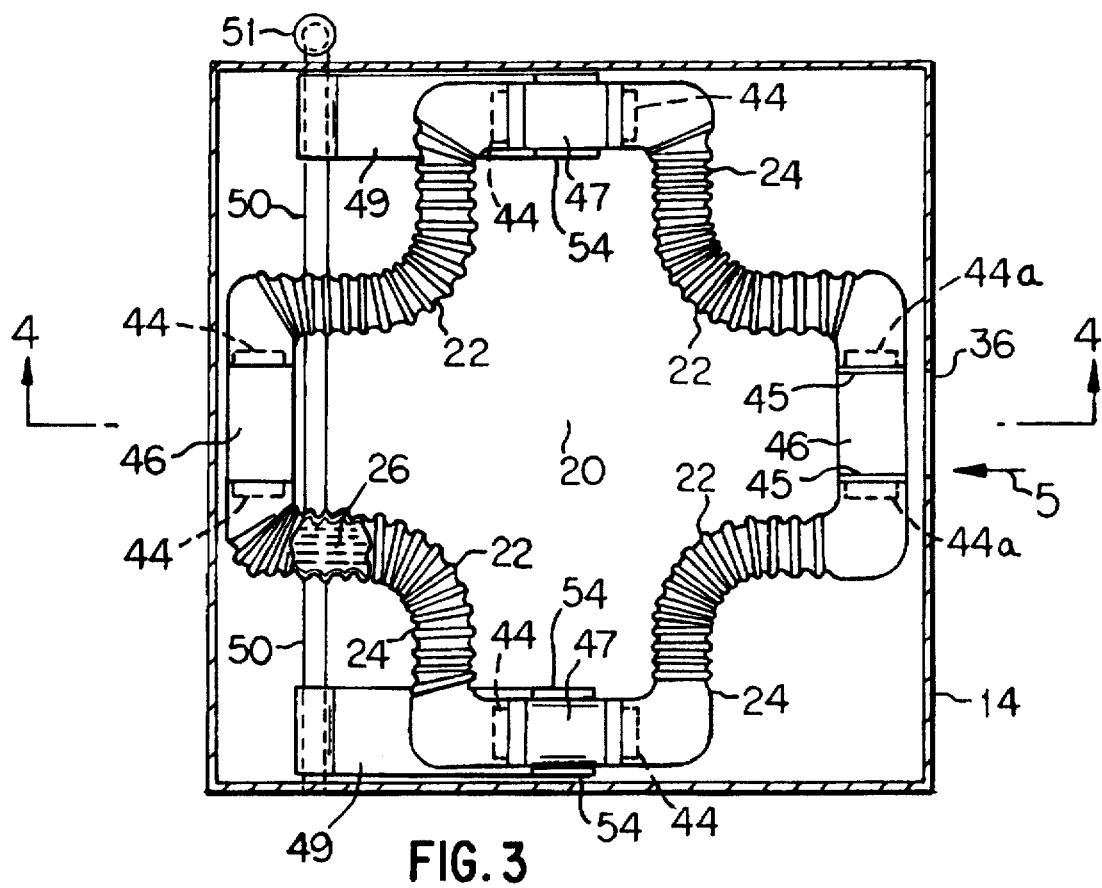
FIG. 3 is a view taken in approximately the same direction as FIG. 1, but showing another embodiment of the invention.
Figure 4:
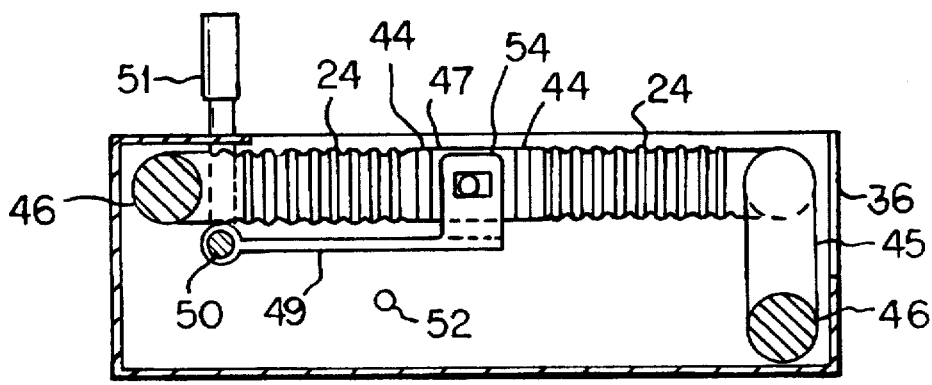
FIG. 4 is a sectional view taken on line 4—4 in FIG. 3.
Figure 5:
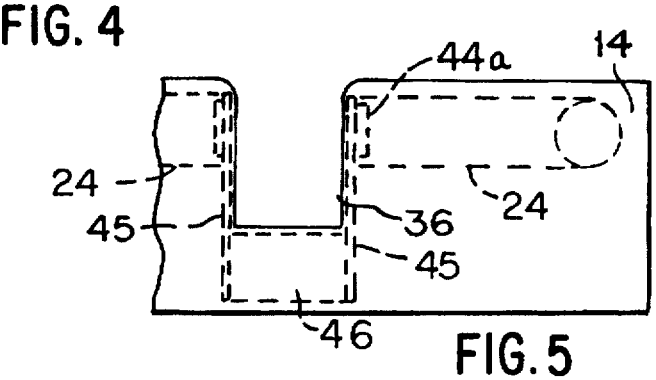
FIG. 5 is a fragmentary side elevational view of the FIG. 3 embodiment, taken in the direction of arrow 5 in FIG. 3.

FIGS. 3 through 5 show a second embodiment of the present invention. In this case there are four exposed container contact elements 22 facing the central axis 20. Each container contact element comprises a separate ribbed flexible plastic tube 24 having two ends thereof fitting onto stationary plug-like pole pieces 44 or 45 that extend from an associated permanent magnet 46 or 47. The permanent magnets are polarized to form a single continuous magnetic circuit.

Each magnet 46 is mounted in a fixed position in the holder housing 10. Each magnet 47 is movably mounted so that it can be separated from its associated pole pieces 44. The pole pieces have reduced diameter plug sections that fit into casings 24 so as to form fixed anchorages for the ends of the tubular casings 24. Each tubular casing has a separate body of magneto-rheologic fluid therein; the liquid is the same for each casing 24.

As shown best in FIG. 5, one sided wall of the holder has a cut-out 36 designed to accommodate the handle of a drinking mug (not shown) when the mug is disposed in the holder. The associated magnet 46 is necessarily located below the plane of cut out 36. In order to operatively connect the magnet to the magnets-rheological fluid, the pole pieces for the magnet take the form of vertical plates 45 suitably secured to end surfaces of the magnet. Plates 45 have plug sections 442a extending into the associated tubular casings 24.

The magnetic circuit for the FIG. 3 holder comprises the permanent magnets 46 and 47, the associated pole pieces 44 and 45, and the liquids in the various tubular casings 24. The magnetic circuit is broken by moving magnets 47 from positions aligned with the associated pole pieces 44 to inactive positions out-of-alignment with the respective pole pieces.

The magnet moving means, as shown in the illustrative drawings comprises two lever arms 49 extending from a rotary pivot shaft 50. A manual handle 51 extends from one end of the shaft to rotate the shaft, and thereby move each lever arm 49 up or down. Downward movement of the lever arm may be limited by a stop 52.

FIG. 4 shows a magnet 47 in its operating position magnetically connected to pole pieces 44. When lever arm 49 is moved down the magnet is lowered to a position partially misaligned with pole pieces 44, such that the magnetic circuit is effectively interrupted.

Each lever arm 49 can be connected to the associated magnet 46 in various ways. As shown, the lever arm has two ears 54 equipped with slots that fit onto small pins projecting from the magnet. The pin-slot connection transfers force from the lever arm to the magnet.

Operationally, the FIG. 3 holder functions in essentially the same fashion as the FIG. 1 holder. Handle 52 and lever arms 49 provide a control means for the movable magnets 46.

Figure 6:
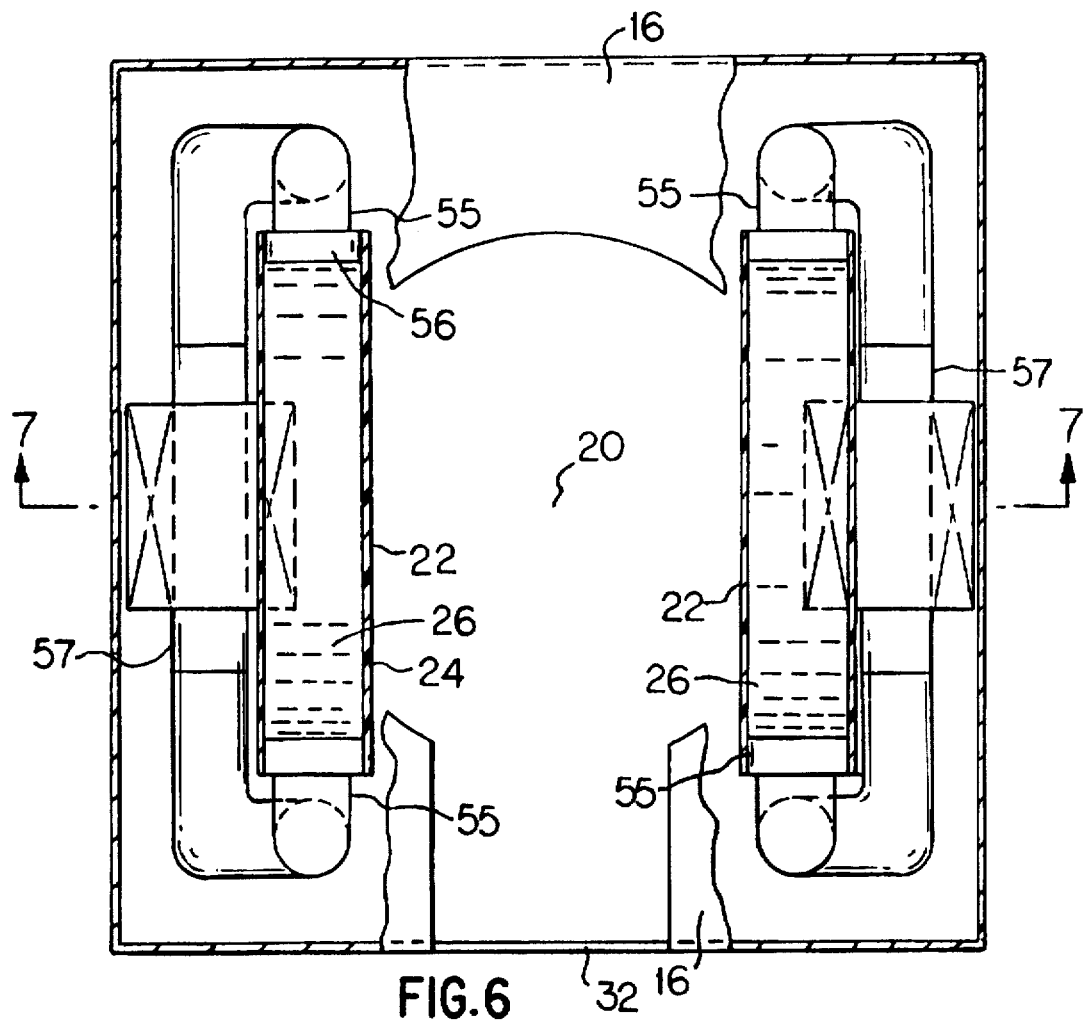
FIG. 6 is a plan view of another construction embodying the invention.
Figure 7:
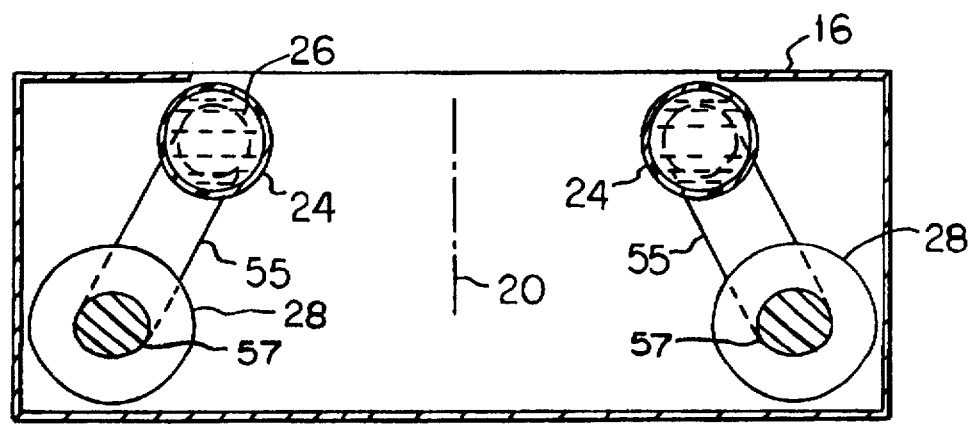
FIG. 7 is a transverse sectional view taken on line 7—7 in FIG. 6.

FIGS. 6 and 7 show yet another embodiment of the present invention wherein there are two container contact elements 22 facing the central axis 20. Each container contact element comprises a linear flexible plastic tubular casing 24 having its opposite ends anchored to magnetic pole pieces 55. Each pole piece has an integral plug portion 56 fitting the end of casing 24, whereby the magnetorheologic fluid 26 is sealed within the casing. The fluid is in direct contact with plugs 56 for eliminating magnetic losses in the associated magnetic circuit.

Each magnetic circuit comprises the two pole pieces 55 and a linear rod-like armature 57 extending through an associated electromagnetic coil 28. The two coils 28, 28 are in series connection with a control switch and indicator lamp, as in the arrangement of FIG. 1. Each pole piece 55 has an essentially U-shape, for magnetically connecting the armature 57 to the fluid in the associated tubular casing 24.

The FIG. 6 holder functions in essentially the same fashion as the previously described holders. Each linear tubular casing 24 (FIG. 6) can be deflected away from central axis 20 to accommodate a range of different size (or shape) beverage containers.

Figure 8:
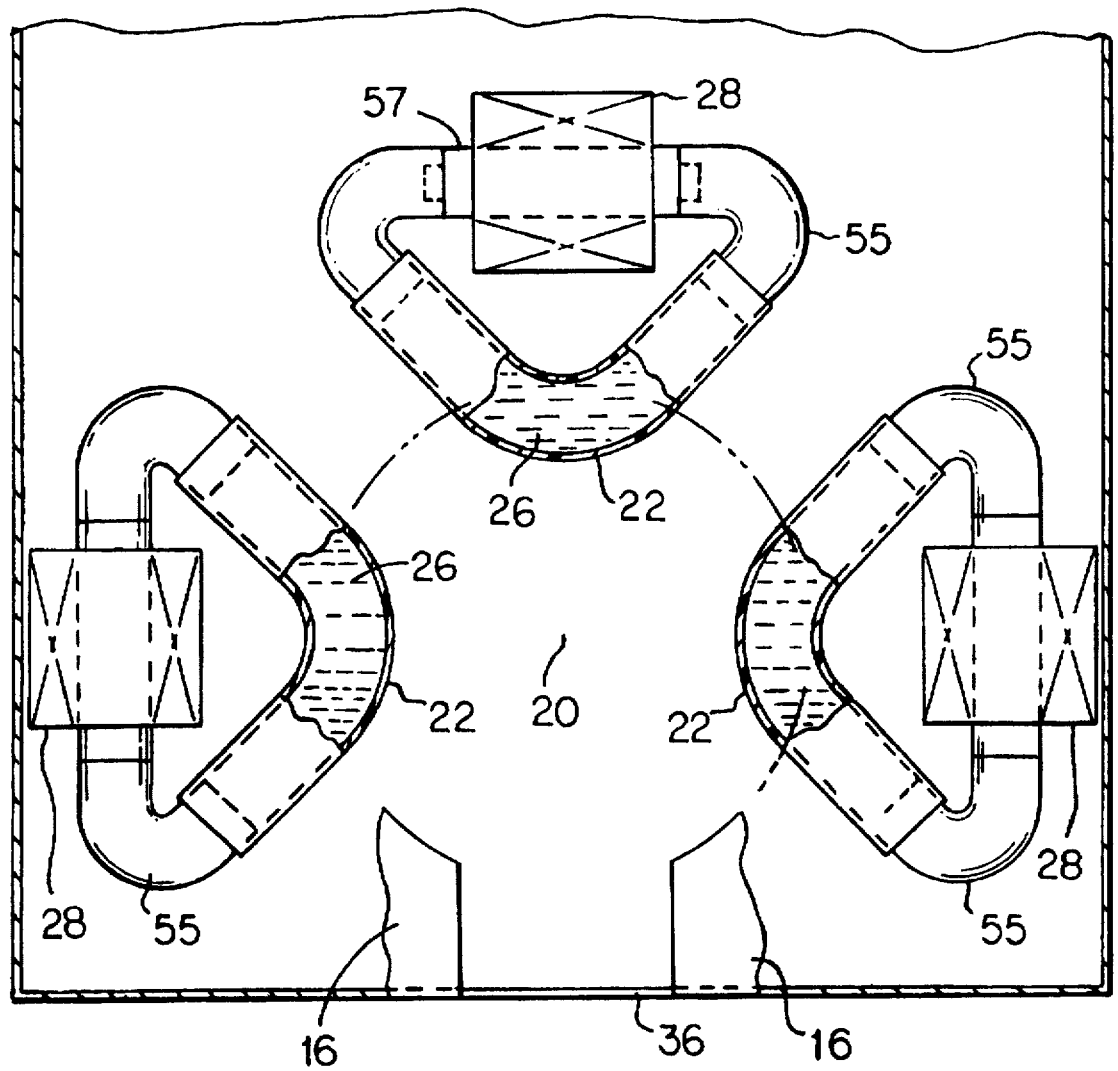
FIG. 8 is a view taken in the same general direction as FIG. 6, but showing an alternative embodiment of the present invention.

FIG. 8 shows a variant of the invention that includes some features used in the FIG. 1 holder and some features used in the FIG. 6 holder. In the FIG. 8 arrangement, each container contact element 22 comprises a separate flexible plastic tubular casing (as in the arrangements of FIGS. 3 and 6.) Also, in the FIG. 8 arrangement, each flexible plastic tubular casing has two anchored ends and a central intermediate portion protruding toward the central axis 20, as in the arrangements of FIGS. 1 and 3.

With the exception of the noted differences, the FIG. 8 arrangement is generally similar in structure and function to individual constructions previously described.

It will be seen, from a general perspective, that the invention can be embodied in various different constructions. The magnetic means can be electromagnetic in nature, or it can be a series of permanent magnets. The number of container contact elements can be varied, e.g. four container contact elements as shown in FIGS. 1 and 3, or three container contact elements as shown in FIG. 8, or two elements as shown in FIG. 6. In preferred practice of the invention the holder is provided with a cut out 36 in the holder side wall for accommodating the protruding handle of a drinking mug.

What is claimed is:

1. A holder for a drink container, comprising:

a container support platform having a central axis;

a series of container contact elements disposed around said central axis for exerting a positioning force on said container resting on the platform;

each of said container contact elements comprises a flexible outer casing and an inner liquid core; said liquid core comprising a material that transitions to a near-solid state when subjected to a magnetic field;

magnet means for applying a magnetic field force to said core liquid; and means for controlling said magnet means.

2. The holder of claim 1, wherein said magnet means comprises an electromagnet, and said control means is a manual electrical switch.

3. The holder of claim 1, wherein said magnet means comprises a permanent magnet, and said control means comprises means for manually moving said permanent magnet.

4. The holder of claim 1, wherein the flexible outer casing of each of said container contact elements comprises a flexible plastic tube.

5. The holder of claim 4, wherein each said plastic tube has a circular cross section.

6. The holder of claim 1, wherein each of said outer casings comprises a flexible circular tube having two anchored ends and an intermediate deflectable section between said ends.

7. The holder of claim 6, wherein each of said intermediate deflectable sections is linear in its undeflected state.

8. The holder of claim 6, wherein each of said intermediate deflectable sections section is an arcuate tubular section that protrudes from the anchored ends toward said central axis.

9. The holder of claim 6, wherein each of said flexible tubes of each of said container contact elements are joined together to form a continuous conduit; each of said liquid cores of each of said contact elements comprising a continuous liquid filling said conduit.

10. The holder of claim 6, wherein each of said flexible tubes of each of said container contact elements form a plurality of liquid cores that are not in fluid communication.

11. The holder of claim 10, wherein said magnet means comprises a pole piece extending within each end of each of said flexible tubes, whereby each of said inner liquid cores are in direct contact with said magnet means.

12. The holder of claim 1, wherein there are four container contact elements; said magnet means comprising three electromagnets connected in series; said four container contact elements comprising a single plastic conduit extending through each of said electromagnets, and a continuous liquid distributed within said conduit.

13. The holder of claim 1, wherein there are two container contact elements, each of said elements comprising a flexible tube having two anchored ends, said magnet means comprising a plurality of electromagnets associated with each of said elements; each of said electromagnets having two pole pieces extending within the anchored ends of a corresponding one of said flexible tubes, whereby each of the inner liquid cores are in direct contact with the magnet means.

14. The holder of claim 1, wherein there are three container contact elements, each of said container contact elements comprising a flexible tube having two anchored ends; said magnet means comprising a plurality of electromagnets associated with each of the container contact elements; each of said electromagnets having two pole pieces extending within the anchored ends of an associated flexible tube, whereby each of the inner liquid cores are in direct contact with the magnet means.

15. The holder of claim 1, wherein there are four container contact elements, each of said contact elements comprising a flexible tube having two anchored ends; said magnet means comprising four permanent magnets interposed between the container contact elements to form a single continuous magnetic circuit.

16. The holder of claim 15, wherein each of said four permanent magnets has two pole pieces extending within the anchored ends of two associated flexible tubes, whereby each of the corner liquid cores are in direct contact with the magnet means.

17. The holder of claim 16, wherein two of the permanent magnets are movable between operating positions aligned with the pole pieces and inactive positions out of alignment with the pole pieces.

18. The holder of claim 1, wherein said magnet means comprises an electromagnetic coil having an automotive low D.C. voltage winding, whereby the holder is especially useful in an automotive vehicle for disposition proximate to a driver's seat of said vehicle.

19. A holder for a drink container, comprising: an upwardly-open housing having a bottom wall and a plural number of upstanding side walls; said bottom wall providing a support platform for said drink container centered on a central axis of the platform; one of the housing side walls having an upwardly-open cutout therein adapted to accommodate a handle of said drink container positioned on the support platform; a plurality of container contact elements disposed around said central axis within said housing for exerting a positioner force on said container resting on the platform; each of said container contact elements comprising a flexible tube and an inner liquid core within said tube; each of said liquid cores comprising a liquid material that transitions to a near-solid state when subjected to a magnetic field; a magnet means for applying a magnetic field force to each of said liquid cores; and means for controlling said magnet means so that when the magnet means is in a first condition the inner cores of each of the tubes are liquid, and when the magnet means is in a second condition the inner cores of each of the tubes are essentially solid.

20. A holder for a drink container comprising: an upwardly-open housing having a bottom wall and a plural number of upstanding side walls; said bottom wall providing a support platform for said drink container; one of the housing side walls having an upwardly-open cut out therein adapted to accommodate a handle of said drink container positioned on the support platform; said platform having an imaginary central axis; a plurality of container contact elements disposed around said central axis within said housing for exerting a positioner force on said container resting on said platform; each of said container contact elements comprising a flexible tube and an inner core material that is normally a liquid; each inner core comprising a normally liquid material that transitions to a near-solid state when subjected to a magnetic field; each of said contact elements being located in a common horizontal plane spaced above the container support platform, whereby said contact elements are enabled to position said drink container against tipping; a magnet means for applying a magnetic field force to said core material; and means for controlling said magnet means so that when the magnet means is in a first condition the core materials within said tubes are liquid, and when the magnet means is in a second condition the core materials within said tubes are essentially solid.

* * * * *